United States Patent
Han (10) Patent No.: US 9,729,004 B2
(45) Date of Patent: Aug. 8, 2017

(54) POWER SOURCE PROTECTION DEVICE AND METHOD

(71) Applicants: Inventec (Pudong) Technology Corporation, Shanghai (CN); INVENTEC CORPORATION, Taipei (TW)

(72) Inventor: Ying-Xian Han, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 283 days.

(21) Appl. No.: 14/600,001

(22) Filed: Jan. 19, 2015

(65) Prior Publication Data

US 2016/0141868 A1 May 19, 2016

(30) Foreign Application Priority Data

Nov. 13, 2014 (CN) .......................... 2014 1 0640317

(51) Int. Cl.
*H01H 83/00* (2006.01)
*H02J 7/00* (2006.01)
*H02J 9/00* (2006.01)

(52) U.S. Cl.
CPC .................................... *H02J 9/005* (2013.01)

(58) Field of Classification Search
CPC ........ H02J 4/00; H02J 1/00; H02J 3/38; H02J 9/005; H02J 2003/388; H02J 3/01; H02J 3/383; H02J 5/00; H02J 7/0063; H02J 7/025; H02J 13/00; H02J 13/0006; H02J 13/0017; H02J 13/0048; H02J 13/0055
(Continued)

(56) References Cited

U.S. PATENT DOCUMENTS 5,469,746 A * 11/1995 Fukunaga ................. G01F 1/60
  73/861.12
6,735,706 B2   5/2004 Tomlinson et al.
(Continued)

FOREIGN PATENT DOCUMENTS

CN      2710247 Y    7/2005
TW      I319136      1/2010
(Continued)

*Primary Examiner* — Carlos Amaya
*Assistant Examiner* — Esayas Yeshaw
(74) *Attorney, Agent, or Firm* — CKC & Partners Co., Ltd.

(57) ABSTRACT

A power source protection device and a power source protection method are disclosed herein. The power source protection device includes a power supply, a power source managing unit and a signal sending unit. The power supply provides a DC input voltage. The power source managing unit receives the DC input voltage, and when a determining voltage related to the input voltage is larger than a set voltage, enters a startup state and outputs a supply voltage. After receiving the supply voltage, the power source managing unit transforms the DC input voltage into a standby power output voltage and provides the standby power output voltage when the signal sending unit sends a control signal to the power source managing unit within an enabling time. VVhen it has not received the control signal within the enabling time, the power source managing unit enters a shutdown state.

10 Claims, 5 Drawing Sheets

(58) Field of Classification Search
USPC .......................................................... 307/125
See application file for complete search history.

(56) References Cited

U.S. PATENT DOCUMENTS

| | | | | |
|---|---|---|---|---|
| 2003/0107855 A1* | 6/2003 | Hsu | ........................ | H02H 3/08 |
| | | | | 361/42 |
| 2003/0139823 A1* | 7/2003 | Ando | ...................... | G06F 1/266 |
| | | | | 700/17 |
| 2006/0284491 A1* | 12/2006 | Kuo | ......................... | G06F 1/26 |
| | | | | 307/116 |
| 2007/0188114 A1* | 8/2007 | Lys | ..................... | H02M 1/4225 |
| | | | | 315/308 |
| 2008/0005401 A1* | 1/2008 | Holley, II | ................. | G06F 5/10 |
| | | | | 710/52 |
| 2009/0085521 A1* | 4/2009 | Kim | ..................... | H02J 7/0031 |
| | | | | 320/134 |
| 2011/0316615 A1* | 12/2011 | Xiong | .................... | G11C 5/147 |
| | | | | 327/525 |
| 2013/0222957 A1* | 8/2013 | Ma | ......................... | G06F 1/305 |
| | | | | 361/86 |
| 2013/0229205 A1* | 9/2013 | Yoneda | ................ | H03K 19/173 |
| | | | | 326/39 |
| 2014/0035489 A1* | 2/2014 | Ghode | ..................... | H02P 5/74 |
| | | | | 318/139 |
| 2014/0355715 A1* | 12/2014 | Hu | ...................... | H04B 1/1607 |
| | | | | 375/297 |
| 2015/0326107 A1* | 11/2015 | Hsiao | ................. | H02M 7/5387 |
| | | | | 323/234 |

FOREIGN PATENT DOCUMENTS

| | | |
|---|---|---|
| TW | 201223055 A | 6/2012 |
| TW | 201329683 A | 7/2013 |
| TW | 201432153 A | 8/2014 |

\* cited by examiner

POWER SOURCE PROTECTION DEVICE AND METHOD

RELATED APPLICATIONS

This application claims priority to Chinese Application Ser. No. 201410640317.1, filed Nov. 13, 2014, which is herein incorporated by reference.

BACKGROUND

Field of invention

The present invention relates to circuit protection technology. More particularly, the present invention relates to a power source protection device and a power source protection method.

Description of Related Art

It goes without saying that the supply of power is important to a server system. In the server system, the supply of many kinds of standby power is usually required, for example, p12v_stby, p5v_stby, p3v3_stby, and the supply of many kinds of DC power is also required, for example, p12v, p5v, p3v3. Therefore, voltage transformation circuits in the system are an important factor in maintaining the normal stable operation of the system. In addition to the correct supply of voltage to the system, control of the time points of voltage output is also indispensable. If the voltage is supplied at wrong time points, leakage, erroneous operation, and even unrecoverable damage to the whole system may occur; therefore, control of the time points of voltage output to protect the system has become an important issue in the related field.

SUMMARY

In order to control voltage output, an aspect of the present disclosure provides a power source protection device. The power source protection device includes a power supply, a power source managing unit and a signal sending unit. The power supply provides a DC input voltage. The power source managing unit receives the DC input voltage, and when a determining voltage corresponding to the DC input voltage is larger than a set voltage, the power source managing unit enters a startup state, outputs a supply voltage and starts counting an enabling time. The signal sending unit receives the supply voltage from the power source managing unit as a power source. When the signal sending unit sends a control signal to the power source managing unit within the enabling time, the power source managing unit transforms the DC input voltage into a standby power output voltage and provides the standby power output voltage. When the power source managing unit does not receive the control signal within the enabling time, the power source managing unit enters a shutdown state.

In an embodiment of the present disclosure, the power source managing unit is an eFuse circuit, and the signal sending unit is a complex programmable logic device.

In an embodiment of the present disclosure, the power source protection device further includes a voltage dividing circuit coupled to the power source managing unit and which determines the set voltage.

In an embodiment of the present disclosure, the set voltage is 5.5 volts.

In an embodiment of the present disclosure, the power source protection device further includes a ready signal sending unit that sends a ready signal to the complex programmable logic device. The complex programmable logic device receives the ready signal to enter a ready state, and when the complex programmable logic device is not in the ready state, the complex programmable logic device stops both receiving the supply voltage and sending the control signal.

Another aspect of the present disclosure provides a power source protection method including the following steps: (a) receiving a DC input voltage provided by a power supply; (b) entering a startup state, outputting a supply voltage to a signal sending unit and starting counting an enabling time when a determining voltage corresponding to the DC input voltage is larger than a set voltage; (c) transforming the DC input voltage into a standby power output voltage and providing the standby power output voltage when a control signal sent from the signal sending unit is received within the enabling time and (d) entering a shutdown state when the control signal is not received within the enabling time.

In an embodiment of the present disclosure, the power source protection method further includes transforming the DC input voltage into the standby power output voltage by an eFuse circuit. The signal sending unit is a complex programmable logic device.

In an embodiment of the present disclosure, the power source protection method further includes determining the set voltage by voltage division.

In an embodiment of he present disclosure, the set voltage is 5.5 volts.

In an embodiment of the present disclosure, the power source protection method further includes sending a ready signal is sent by a ready signal sending unit; receiving the ready signal to enter a ready state by the complex programmable logic device; and stopping the processes of receiving the supply voltage and sending the control signal when the complex programmable logic device is not in the ready state.

In conclusion, the present disclosure is directed to improving voltage output methods by a control signal that is sent within an enabling time or further incorporated with a ready signal to determine whether the standby power output voltage is provided so as to avoid leakage, erroneous operation, and even unrecoverable damage to the whole system that may result from the standby power output voltage being provided to the load right after the DC input voltage reaches a certain value.

The following is a detailed description of the aforementioned contents through embodiments, and provides further explanation of the technical aspects of the present disclosure.

BRIEF DESCRIPTION OF THE DRAWINGS

In order to make the aforementioned contents, and other purposes, features, advantages, and embodiments more clear and understandable, with description made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the invention to these embodiments. On the contrary, the invention is intended to cover alternatives, modifications and equivalents, which may be included within the spirit and scope of the disclosure as defined by the appended claims.

Figure 1:
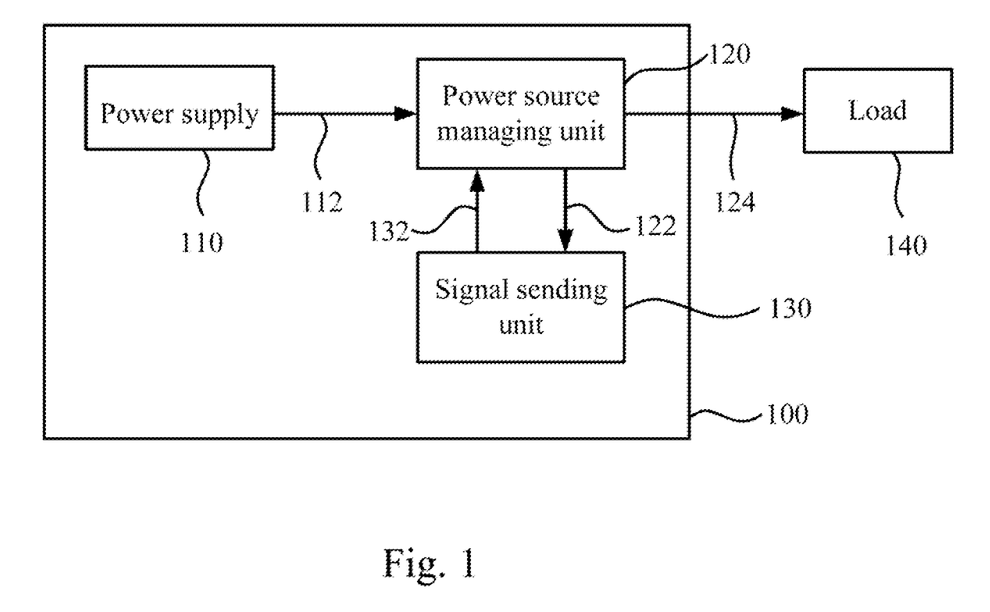
FIG. 1 is a schematic diagram of a power source protection device according to a first embodiment of the present disclosure.

FIG. 1 is a schematic diagram showing a power source protection device 100 according to a first embodiment of the present disclosure. The power source protection device 100 includes a power supply 110, a power source managing unit 120, and a signal sending unit 130. In practice, the power supply 110 includes a DC voltage supply circuit or another device that can supply DC voltage. The power source managing unit 120 includes combinations of many circuits, such as an eFuse circuit, a DC-to-AC circuit, an AC-to-DC circuit, a transformer circuit, a logic circuit, and a comparator circuit, may include at least one input terminal and at least one output terminal, and may be integrated into a swap controller chipset. The signal sending unit 130 may be a signal generator, an oscillator circuit, a logic circuit, or a programmable integrated circuit component, such as a field-programmable gate array (FPGA) or a complex programmable logic device (CPLD).

The power supply 110 provides a DC input voltage 112 to the power source managing unit 120. The power source managing unit 120 receives the DC input voltage 112 from the power supply 110. The DC input voltage 112 can simultaneously be used for supply to the power source managing unit 120 to allow for normal operation of the same, and can serve as a source of a determining voltage for power source protection. When a determining voltage transformed from the DC input voltage 112 by components in the device circuits is larger than a set voltage, the power source managing unit 120 immediately enters a startup state, and outputs a supply voltage 122 to the signal sending unit 130 to provide the voltage required for operation of the signal sending unit 130. After the signal sending unit 130 receives the supply voltage 122 from the power source managing unit 120 as a power source, the signal sending unit 130 is capable of sending a control signal 132. If the power source managing unit 120, which has entered the startup state, receives the control signal 132 from the signal sending unit 130 within an enabling time, then the power source managing unit 120 can transform the DC input voltage 112 into a standby power output voltage 124 and provide the standby power output voltage 124 to a load 140. In the present embodiment, the DC input voltage 112 is p12v, and the standby power output voltage 124 is p12v_stby. The conditions of sending the control signal 132 to the power source managing unit 120 can be flexibly designed according to user requirements, in order to control the power source managing unit 120 to provide the standby power output voltage 124 to the load 140 at correct time points, thereby preventing the supply of the standby power output voltage 124 at wrong time points which would result in system damage. In addition, when the power source managing unit 120 does not receive the control signal 132 within the enabling time after entering the startup state, the power source managing unit 120 immediately enters a shutdown state to avoid an unexpected control signal 132 that causes the standby power output voltage 124 at wrong time points to result in system damage. If it becomes necessary to provide the standby power output voltage 124, the power source managing unit 120 has to enter the startup state again and receive the control signal 132 from the signal sending unit 130 within the enabling time, before the power source managing unit 120 can provide the standby power output voltage 124 successfully. In the present embodiment, the enabling time is about 0.5 seconds and can be determined by a capacitor coupled to the power source managing unit 120. An equation of the relationship between a capacitance of the capacitor and the enabling time is as follows: enabling time=capacitance*1s/µF.

In an embodiment, the power source managing unit 120 is an eFuse circuit that transforms the DC input voltage 112 into the standby power output voltage 124, in which the standby power output voltage 124 can be flexibly designed through the eFuse circuit according to actual requirements. The signal sending unit 130 is a CPLD. After the CPLD receives the supply voltage 122 from the power source managing unit 120, the CPLD can operate normally and executes CPLD programs designed by users to provide the standby power output voltage 124 to the load at correct time points. In the present embodiment, the DC input voltage 112 is p12v, the standby power output voltage 124 is p12v_stby, and the supply voltage 122 is p6v_stby that is transformed into p3v3 stby by voltage transformer circuits and connected to the CPLD 230 to provide the power source for CPLD operation.

Figure 2:
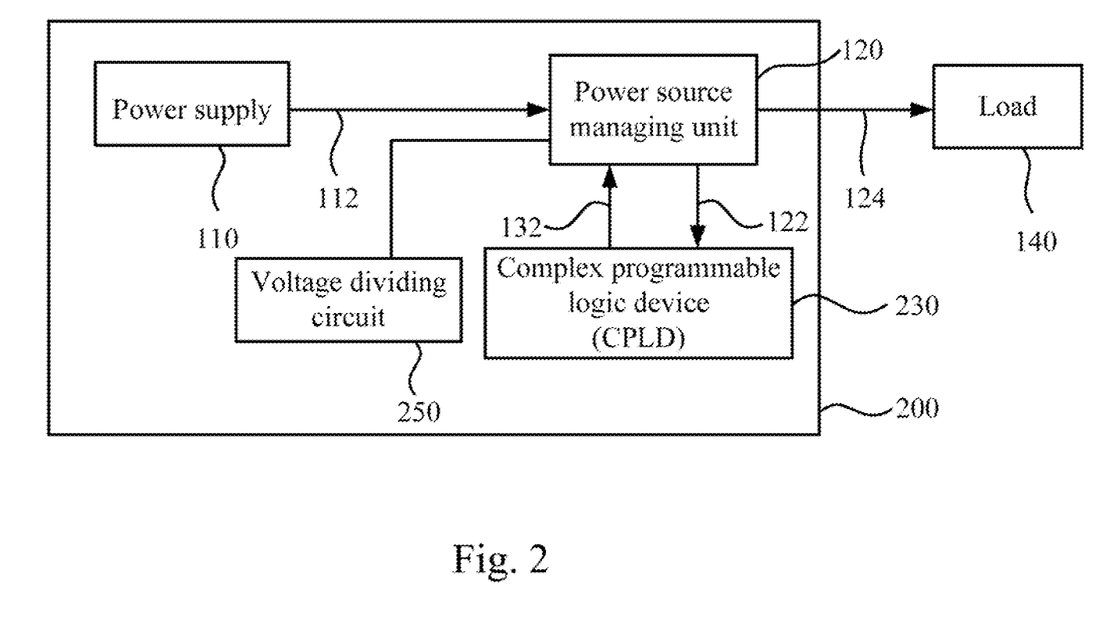
FIG. 2 is a schematic diagram of a power source protection device according to a second embodiment of the present disclosure.
Figure 3:
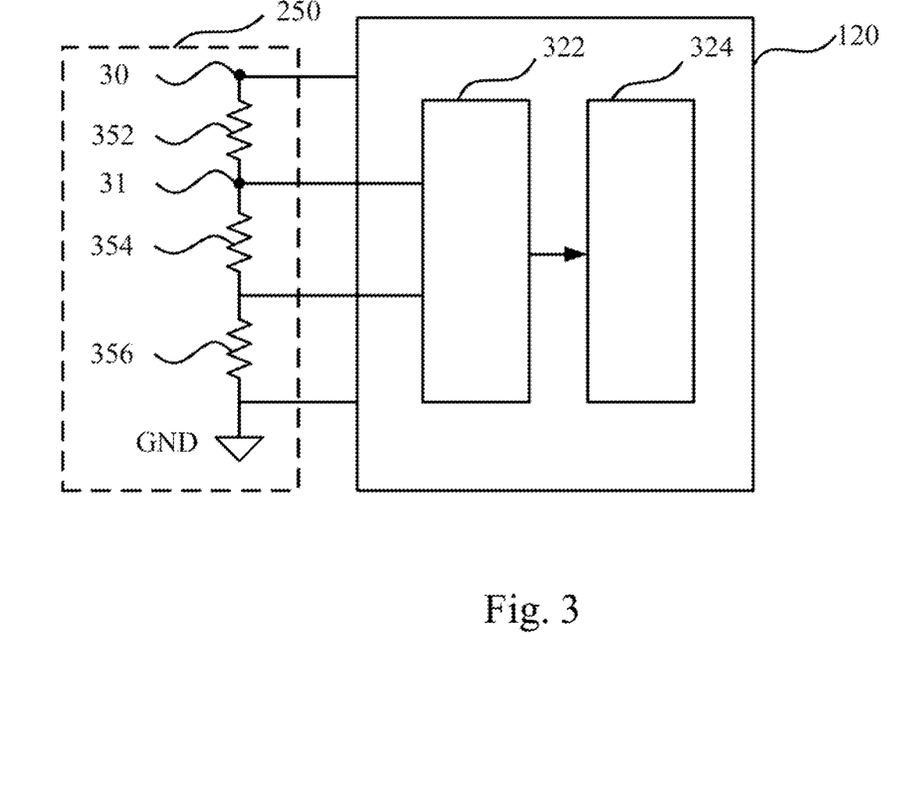
FIG. 3 is a schematic diagram of a voltage dividing circuit coupled to a power source managing unit according to the second embodiment of the present disclosure.

In order to further describe the set voltage in the present disclosure, reference is made to FIG. 2, which is a schematic diagram showing a power source protection device 200 according to a second embodiment of the present disclosure. The power source protection device 200 has substantially the same configuration as the power source protection device 100 in FIG. 1 except for further including a CPLD 230 and a voltage dividing circuit 250. The voltage dividing circuit 250 is coupled to the power source managing unit 120, and is used to determine a value of a set voltage and define conditions under which the power source managing unit 120 enters a startup state. Specifically, as shown in FIG. 3, the voltage dividing circuit 250 includes three resistors 352, 354, 356 connected in series, and is coupled to a comparator circuit 322 in the power source managing unit 120. The comparator circuit 322, in turn, is coupled to a logic circuit 324 to define conditions of entering the startup state, that is, the set voltage. In the present embodiment, a resistance of a first resistor 352 is 34.8 Kohm, a resistance of a second resistor 354 is 10 Kohm, a resistance of a third resistor 356 is 0 ohms, and the voltage dividing circuit is combined with the comparator circuit 322 to result in the set voltage that is about 5.5 volts. When the DC input voltage 112 is inputted into the node 30 and the determining voltage generated by the voltage dividing circuit 250, that is, the voltage of the node 31 of the power source managing unit 120, is larger than the set voltage of 5.5 volts, the logic circuit 324 determines that the power source managing unit 120 has entered the startup state and outputs the supply voltage 122. Alternatively, the voltage dividing circuit 250 and the power source managing unit 120 can also be integrated into a single unit to achieve the effect of reducing circuit area.

Figure 4:
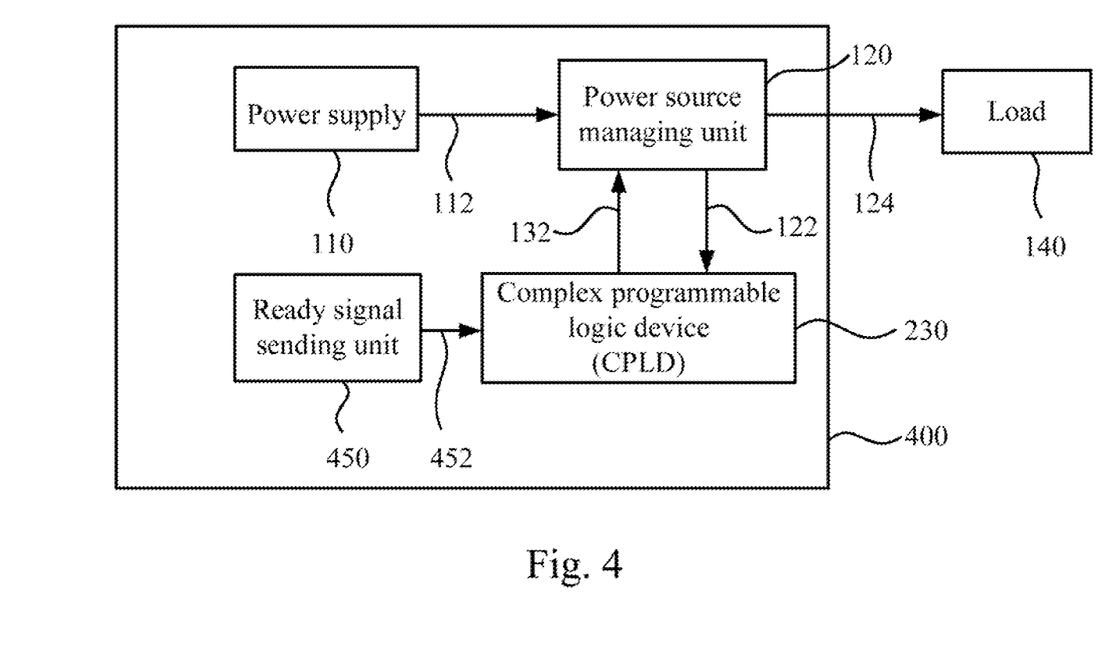
FIG. 4 is a schematic diagram of a power source protection device according to a third embodiment of the present disclosure.

Alternatively, operation of the CPLD 230 can also be controlled by a ready signal 452 from a ready signal sending unit 450. FIG. 4 is a schematic diagram showing a power source protection device 400 according to a third embodiment of the present disclosure. The power source protection device 400 has substantially the same configuration as the power source protection device 100 in FIG. 1 except for further including a CPLD 230 and a ready signal sending unit 450.

The third embodiment of the present disclosure shows the power source protection device 400 which has a two-step turning on mechanism to provide a more rigorous circuit protection function. When the CPLD 230 receives a supply voltage 122 from a power source managing unit 120, there is a voltage level at output terminals of the CPLD 230 at the same time. In other words, the control signal 132 is at a nonzero voltage level. In order to avoid leakage, erroneous operation, or unrecoverable damage that may occur due to erroneous output of the control signal 132, the CPLD 230 is controlled by the ready signal 452 from the ready signal sending unit 450 to determine whether the CPLD has entered a ready state capable of receiving the supply voltage 122.

When the CPLD 230 is not in the ready state, the CPLD 230 stops both receiving the supply voltage and sending the control signal. Specifically, after the CPLD 230 completes initialization, the ready signal sending unit 450 sends the ready signal 452 to the CPLD 230 to make the CPLD 230 enter the ready state. In the present embodiment, the ready signal sending unit 450 is an FPGA. Before the CPLD 230 completes initialization, the FPGA does not send the ready signal 452 to the CPLD 230 and at this moment the CPLD 230 is not in the ready state so that even though the power source managing unit 120 already enters the startup state and outputs the supply voltage 122, the CPLD 230 still stops receiving the supply voltage 122 to avoid erroneous voltage output. After the CPLD 230 completes initialization, the FPGA sends the ready signal 452 to the CPLD 230 to make the CPLD enter the ready state (the first step of turning on). The CPLD 230 receives the supply voltage 122 from the power source managing unit 120 and outputs the control signal 132 to the power source managing unit 120 according to the CPLD programs designed by users, and the power source managing unit 120 provides the standby power output voltage 124 to the load 140 (the second step of turning on).

Figure 5:
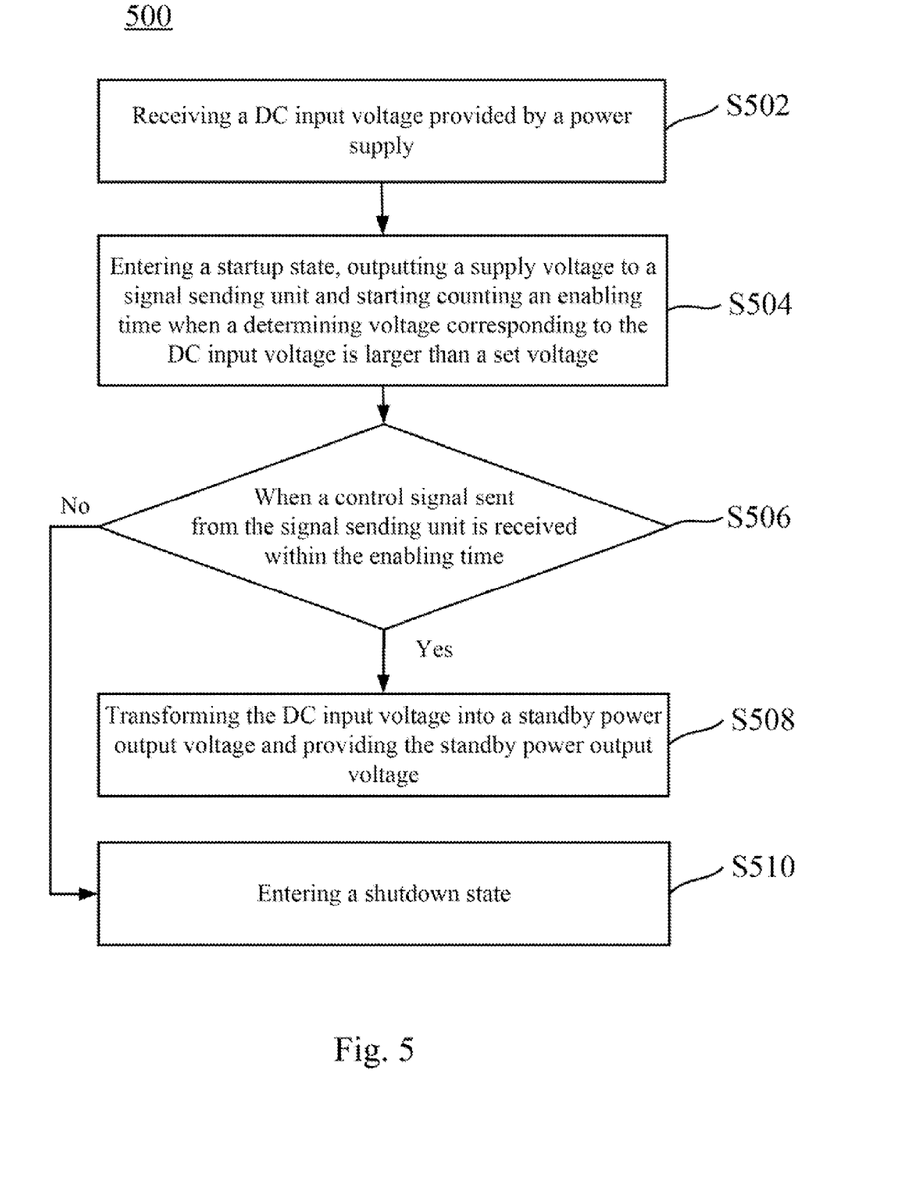
FIG. 5 is a flow chart of a power source protection method according to an embodiment of the present disclosure.

As shown in FIG. 5, the power source protection method 500 includes a plurality of steps S502-S510. However, those skilled in the art should understand that the sequence of the steps in the present embodiment may be adjusted according to actual needs unless otherwise specified. All or parts of the steps can even be executed simultaneously. Because the configurations used to implement the steps are specifically disclosed in the above embodiments, a description in this regard will not be repeated hereinafter.

First, in step S502, a DC input voltage provided by a power supply is received. The DC input voltage can simultaneously provide a power source supply and serve as a source of the determining voltage for power source protection. Next, in step S504, a startup state is entered, a supply voltage is outputted to a signal sending unit and a process of counting an enabling time is started when a determining voltage corresponding to the DC input voltage is larger than a set voltage. After the signal sending unit receives the supply voltage from the power source managing unit as the power source, the signal sending unit sends a control signal. Subsequently, in step S506, if the control signal from the signal sending unit is received within the enabling time, then the DC input voltage can be transformed into a standby power output voltage and the standby power output voltage is provided to a load (step S508). In the present embodiment, the DC input voltage is p12v, and the standby power output voltage is p12v_stby. The conditions of sending the control signal to the power source managing unit can be flexibly designed according to user requirements in order to control the power source managing unit to provide the standby power output voltage to the load at correct time points and prevent the standby power output voltage from being provided at wrong time points, which would result in system damage. In addition, when the control signal is not received within an enabling time after the startup state is entered, a shutdown state is immediately entered (step S510) to avoid an unexpected control signal which would result in the standby power output voltage from being provided at wrong time points, resulting in system damage. If it becomes necessary to provide the standby power output voltage, the startup state has to be entered again and the control signal needs to be received from the signal sending unit within the enabling time, before the standby power output voltage can be provided successfully. In the present embodiment, the enabling time is about 0.5 seconds and can be determined by a capacitor. An equation of the relationship between a capacitance of the capacitor and the enabling time is as follows: enabling time=capacitance*1s/µF.

In an embodiment, the DC input voltage is transformed into the standby power output voltage by an eFuse circuit, in which the standby power output voltage can be flexibly designed through the eFuse circuit according to actual requirements. The signal sending unit is a CPLD. After the CPLD receives the supply voltage, the CPLD can operate normally and execute CPLD programs designed by users to provide the standby power output voltage to the load at correct time points. In the present embodiment, the DC input voltage is p12v, the standby power output voltage is p12v_stby, and the supply voltage is p6v_stby that is transformed into p3v3_stby by voltage transformer circuits and connected to the CPLD to provide the power source for CPLD operation.

The aforementioned set voltage can be determined by a voltage dividing means to define conditions in which a startup state is entered. Specifically, as shown in FIG. 3, voltage dividing is implemented by a voltage dividing circuit 250 that includes three resistors 352, 354, 356 that are connected in series to define conditions for entering the startup state, that is, the set voltage. In the present embodiment, a resistance of a first resistor 352 is 34.8 Kohm, a resistance of a second resistor 354 is 10 Kohm, a resistance of a third resistor 356 is 0 ohms, and the voltage dividing circuit is combined with the comparator circuit 322 to result in the set voltage that is about 5.5 volts. When the determining voltage generated from the DC input voltage by the voltage dividing circuit 250 is larger than the set voltage of 5.5 volts, the startup state is entered and the supply voltage is outputted.

The present disclosure can also be designed as a power protection method involving a two-step turning on mechanism to thereby provide a more rigorous circuit protection function. In order to avoid leakage, erroneous operation, or unrecoverable damage that may occur due to erroneous output of the control signal, the CPLD is controlled by the ready signal from the ready signal sending unit to determine whether the CPLD has entered a ready state capable of receiving the supply voltage. When the CPLD is not in the ready state, the CPLD stops both receiving the supply voltage and sending the control signal. Specifically, after the CPLD completes initialization, the ready signal sending unit sends the ready signal to the CPLD to make the CPLD enter the ready state. In the present embodiment, the ready signal is sent by an FPGA. Before the CPLD completes initialization, the FPGA does not send the ready signal to the CPLD and at this moment the CPLD is not in the ready state so that the CPLD stops receiving the supply voltage to avoid erroneous voltage output. After the CPLD completes initialization, the FPGA sends the ready signal to the CPLD to make the CPLD enter the ready state (the first step of turning on), and the CPLD can receive the supply voltage and output the control signal according to the CPLD programs designed by users to provide the standby power output voltage to the load (the second step of turning on).

In conclusion, the present disclosure can improve voltage output methods through the aforementioned embodiments so as to avoid leakage, erroneous operation, and even unrecoverable damage to the whole system that may result from the standby power output voltage being provided to the load right after the DC input voltage reaches a certain value by a control signal sent within an enabling time or further incorporated with a ready signal to determine whether the standby power output voltage is provided.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power source protection device, comprising:
   a power supply configured to provide a DC input voltage;
   a power source managing unit configured to receive the DC input voltage, wherein when a determining voltage corresponding to the DC input voltage is larger than a set voltage, the power source managing unit enters a startup state, outputs a supply voltage and starts counting an enabling time; and
   a signal sending unit configured to receive the supply voltage from the power source managing unit as a power source, wherein when the signal sending unit sends a control signal to the power source managing unit within the enabling time, the power source managing unit transforms the DC input voltage into a standby power output voltage and provides the standby power output voltage, and when the power source managing unit does not receive the control signal within the enabling time, the power source managing unit enters a shutdown state.

2. The power source protection device of claim 1, wherein the power source managing unit is an eFuse circuit, and the signal sending unit is a complex programmable logic device.

3. The power source protection device of claim 2, further comprising:
   a voltage dividing circuit coupled to the power source managing unit and configured to determine the set voltage.

4. The power source protection device of claim 3, wherein the set voltage is 5.5 volts.

5. The power source protection device of claim 2, further comprising:
   a ready signal sending unit configured to send a ready signal to the complex programmable logic device;
   wherein the complex programmable logic device receives the ready signal to enter a ready state, and when the complex programmable logic device is not in the ready state, the complex programmable logic device stops both receiving the supply voltage and sending the control signal.

6. A power source protection method, comprising:
   (a) receiving a DC input voltage provided by a power supply;
   (b) entering a startup state, outputting a supply voltage to a signal sending unit and starting counting an enabling time when a determining voltage corresponding to the DC input voltage is larger than a set voltage;
   (c) transforming the DC input voltage into a standby power output voltage and providing the standby power output voltage when a control signal sent from the signal sending unit is received within the enabling time; and
   (d) entering a shutdown state when the control signal is not received within the enabling time.

7. The power source protection method of claim 6, further comprising:
   transforming the DC input voltage into the standby power output voltage by an eFuse circuit, wherein the signal sending unit is a complex programmable logic device.

8. The power source protection method of claim 7, further comprising:
   determining the set voltage by voltage division.

9. The power source protection method of claim 8, wherein the set voltage is 5.5 volts.

10. The power source protection method of claim 7, further comprising:
    sending a ready signal by a ready signal sending unit;
    receiving the ready signal to enter a ready state by the complex programmable logic device; and
    stopping both receiving the supply voltage and sending the control signal when the complex programmable logic device is not in the ready state.

* * * * *